United States Patent
Chu et al.

(10) Patent No.: US 9,014,105 B2
(45) Date of Patent: Apr. 21, 2015

(54) 80MHZ/160MHZ TRANSMISSION OPPORTUNITY (TXOP) PROTECTION IN 802.11AC TRANSMISSIONS

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 568 days.

(21) Appl. No.: 12/956,305

(22) Filed: Nov. 30, 2010

(65) Prior Publication Data

US 2012/0134324 A1 May 31, 2012

(51) Int. Cl.
- H04W 4/00 (2009.01)
- H04W 74/08 (2009.01)
- H04W 84/12 (2009.01)
- H04W 28/06 (2009.01)
- H04L 27/00 (2006.01)
- H04W 72/02 (2009.01)

(52) U.S. Cl.
CPC .......... *H04W 74/0816* (2013.01); *H04W 84/12* (2013.01); *H04W 28/06* (2013.01); *H04L 27/0006* (2013.01); *H04W 72/02* (2013.01)

(58) Field of Classification Search
CPC .. H04W 84/12; H04W 28/06; H04L 27/0006; H04L 5/0053; H04L 5/0091
See application file for complete search history.

(56) References Cited

U.S. PATENT DOCUMENTS

| | | | |
|---|---|---|---|
| 2005/0143081 A1* | 6/2005 | Stephens | 455/451 |
| 2008/0192644 A1* | 8/2008 | Utsunomiya et al. | 370/252 |
| 2010/0177657 A1* | 7/2010 | Kim et al. | 370/252 |
| 2011/0096796 A1* | 4/2011 | Zhang et al. | 370/474 |
| 2012/0113952 A1* | 5/2012 | Kneckt et al. | 370/330 |

OTHER PUBLICATIONS

"IEEE P802.11 Wireless LANs" doc: IEEE802.11-09/0992r18, Sep. 16, 2010.*

* cited by examiner

*Primary Examiner* — Ayaz Sheikh
*Assistant Examiner* — Hai-Chang Hsiung
(74) *Attorney, Agent, or Firm* — Seed IP Law Group PLLC

(57) ABSTRACT

A method and apparatus for negotiating an idle subchannel set for a wireless data transmission. The method includes transmitting an indication of a first set of idle subchannels to a wireless station. The method also includes receiving an indication of a second set of idle subchannels from the wireless station. The method further includes determining a final set of idle subchannels based on the indication of the first set of idle subchannels and the indication of the second set of idle subchannels.

24 Claims, 6 Drawing Sheets

80MHZ/160MHZ TRANSMISSION OPPORTUNITY (TXOP) PROTECTION IN 802.11AC TRANSMISSIONS

TECHNICAL FIELD

The present disclosure is directed, in general, to wireless communications, and more specifically, to protection of transmission opportunities in IEEE 802.11ac 80 MHz and 160 MHz transmissions.

BACKGROUND

The IEEE 802.11ac standard introduces new features that are not found in earlier versions of the 802.11 standard. For example, 802.11ac introduces 80 MHz and 160 MHz communication channels, DL MU-MIMO (downlink multi-user multiple input/multiple output), new 802.11ac preambles, and other features that are not found in earlier versions of the standard, and thus may not be utilized by legacy stations. 802.11ac stations (STAs) can use 80 MHz and 160 MHz transmissions to achieve a one gigabit/second (1 gbps) transmission target.

SUMMARY

A method for negotiating an idle subchannel set for a wireless data transmission is provided. The method includes transmitting an indication of a first set of idle subchannels to a wireless station. The method also includes receiving an indication of a second set of idle subchannels from the wireless station. The method further includes determining a final set of idle subchannels based on the indication of the first set of idle subchannels and the indication of the second set of idle subchannels.

An access point for use in a wireless network and configured to negotiate an idle subchannel set for a wireless data transmission is provided. The access point is configured to transmit an indication of a first set of idle subchannels to a wireless station. The access point is also configured to receive an indication of a second set of idle subchannels from the wireless station. The access point is further configured to determine a final set of idle subchannels based on the indication of the first set of idle subchannels and the indication of the second set of idle subchannels.

For use in a wireless network, a wireless station configured to negotiate an idle subchannel set for a wireless data transmission with an access point in the wireless network is provided. The wireless station is configured to receive an indication of a first set of idle subchannels from the access point. The wireless station is also configured to transmit an indication of a second set of idle subchannels to the access point. A final set of idle subchannels is determined based on the indication of the first set of idle subchannels and the indication of the second set of idle subchannels.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
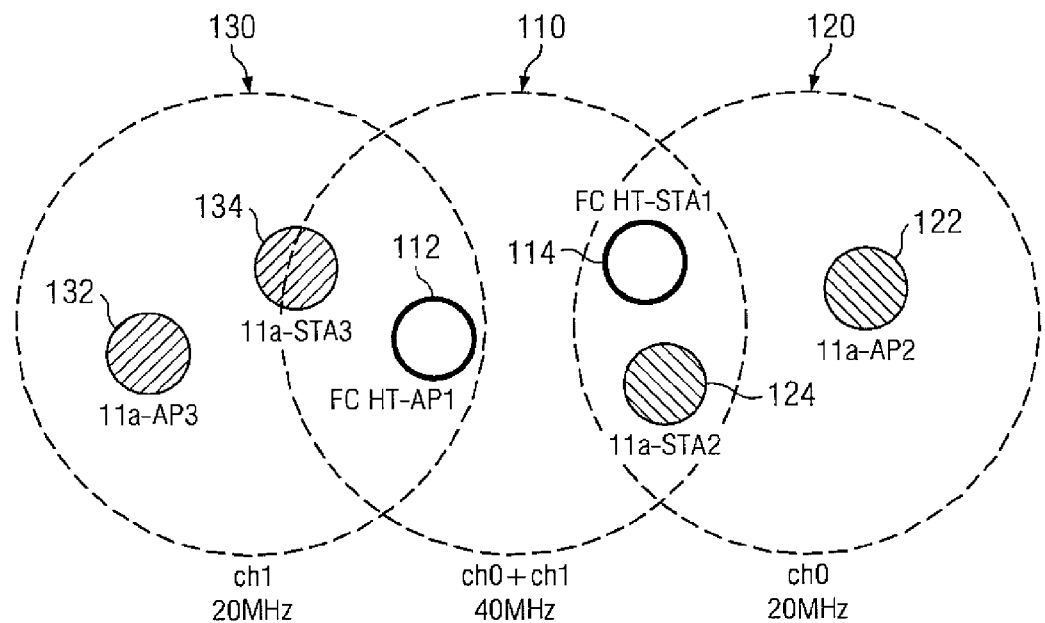
FIG. 1 illustrates a method of protecting an 802.11n transmission using a 40 MHz non-HT replicate mode, according to an embodiment of the present disclosure.
Figure 1:
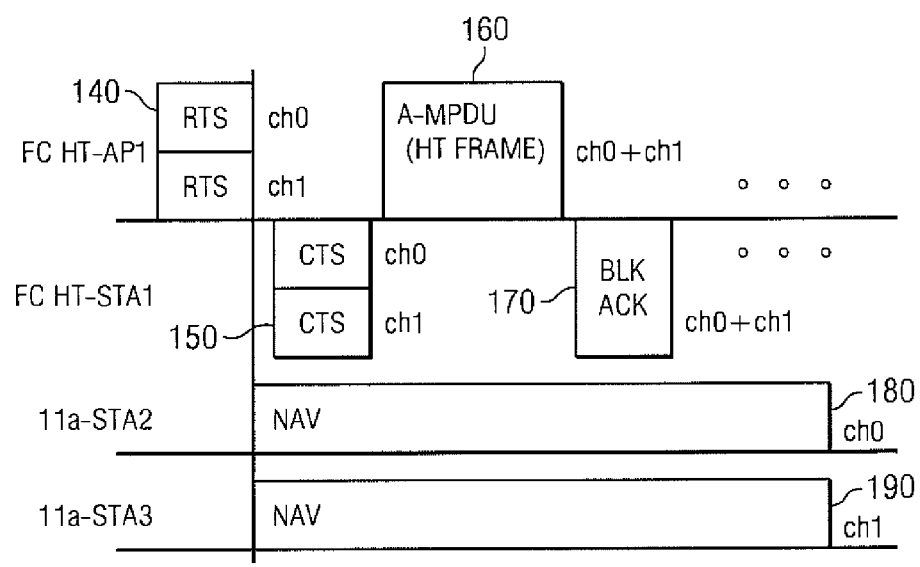

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

The IEEE 802.11n standard introduces many enhancements that a legacy 802.11 (e.g., 802.11a, 802.11g) station (STA) cannot understand or exploit. For example, 802.11n introduces 40 MHz HT (high throughput) transmission channels, frame aggregation, short guard interval (GI), and other features that are not found in earlier versions of the standard, and thus may not be utilized by legacy STAs.

Likewise, the IEEE 802.11ac standard introduces new features that are not understood by either legacy 802.11 STAs or 802.11n STAs. For example, 802.11ac introduces 80 MHz and 160 MHz VHT (very high throughput) communication channels, DL MU-MIMO (downlink multi-user multiple input/multiple output), new 802.11ac preambles, and other features. These features may not be utilized by legacy STAs, including 802.11n STAs.

802.11ac STAs can communicate over 80 MHz and 160 MHz channels to achieve a 1 gbps transmission rate target. 801.11ac transmissions are preferably protected from legacy channel access for the duration of the transmission.

FIG. 1 illustrates a method of protecting an 802.11n transmission using a 40 MHz non-HT replicate mode, according to one embodiment of the present disclosure. As shown in FIG. 1, a HT access point 112 serves as an access point for an 802.11n transmission area 110. A legacy (e.g., 802.11a) access point 122 serves as an access point for a second transmission area 120. Likewise, another legacy access point 132 serves as an access point for a third transmission area 130.

Transmissions to and from legacy access point 122 are carried over a legacy 20 MHz channel, designated in FIG. 1 as channel 0. Likewise, transmissions to and from legacy access point 132 are carried over a second legacy 20 MHz channel, designated as channel 1. Transmissions to and from HT access point 112 are carried over a HT 40 MHz channel that includes both channel 0 and channel 1.

Each transmission area encompasses at least one station that is visible to the access point of that transmission area. For example, transmission area 110 includes HT STA 114. Likewise, transmission area 120 includes legacy STA 124 and transmission area 130 includes legacy STA 134. Due to overlap between transmission areas, it is possible for a station to occupy multiple transmission areas. For example, STA 124 is also within transmission area 110, HT STA 114 is also within transmission area 120, and STA 134 is on the edge of transmission area 110.

Sometimes, multiple stations may be visible to an access point in a transmission area, but the stations may not be visible to each other. For example, STAs 114, 124, 134 are all within transmission area 110 and may be visible to access point 112. However, STA 134 may not be visible to STAs 114, 124. This is commonly called the "hidden node problem." The hidden node problem can lead to interference or collisions in transmissions, and other difficulties in media access control. Thus, it may be necessary to protect transmissions to avoid interference or collisions.

In 802.11a/g, an RTS/CTS (ready-to-send/clear-to-send) handshake may be used to protect a transmission between an access point and a station. For example, an access point may transmit an RTS frame over a channel (e.g., channel 0 or channel 1). A station that wants to communicate with the access point then sends a CTS frame back to the access point over the same channel.

As described earlier, HT access point 112 and HT STA 114 communicate over a 40 MHz 802.11n channel that includes two 20 MHz channels: channel 0 and channel 1. In order to protect their communication from interference, HT access point 112 and HT STA 114 may want to exchange an RTS/CTS handshake. However, transmission of either a 40 MHz RTS or a 40 MHz CTS will not be detected by legacy nodes 122, 124, 132, 134 because they are not 802.11n-compatible.

Therefore, as shown in FIG. 1, HT access point 112 and HT STA 114 may exchange an RTS/CTS handshake using non-HT replicate frames in 20 MHz channels. For example, HT access point 112 transmits two RTS frames 140, one on channel 0 and one on channel 1. Each RTS frame 140 is substantially a replicate of the other. Both RTS frames 140 are on 20 MHz channels and are able to be understood by both legacy STAs 124, 134 and HT STA 114. HT STA 114 responds to RTS frames 140 by sending two CTS frames 150, one on channel 0 and one on channel 1. Each CTS frame 150 is substantially a replicate of the other. Both CTS frames 150 are on 20 MHz channels and are able to be understood by both legacy STAs 124, 134 and HT access point 112.

Thus, the RTS 140 and CTS 150 are used to establish protection of a TXOP in two 20 MHz channels, channel 0 and channel 1. However, HT access point 112 and HT STA 114 may want to communicate on a single 40 MHz channel according to the 802.11n standard. To establish a 40 MHz EDCA-based TXOP, HT STA 114 executes an enhanced distributed channel access (EDCA) back-off procedure in the primary channel (e.g., channel 0), and detects that the secondary channel (e.g., channel 1) is idle during a Point Control Function (PCF) Inter-Frame Spacing (PIFS) interval before the TXOP.

Once the 40 MHz TXOP is established, HT access point 112 and HT STA 114 may communicate over the 40 MHz channel. HT access point 112 may transmit an aggregate MAC protocol data unit (A-MDPU) 160 on an HT frame. HT STA 114 may then transmit an acknowledgement (ACK) block 170. This exchange may continue until the end of the TXOP. Non-HT replicate CF-End (contention-free period end) frames transmitted on channel 0 and channel 1 may be used to truncate the protected TXOP.

By listening to the RTS/CTS exchange between HT STA 114 and HT access point 112, the legacy STAs 124, 134 know not to transmit any signals during the TXOP that would interfere with the communication between HT STA 114 and HT access point 112. Thus, legacy STA 124 counts down a NAV timer 180 on channel 0, and legacy STA 134 counts down a NAV timer 190 on channel 1.

Although FIG. 1 illustrates one example of TXOP protection, various changes may be made to FIG. 1. For example, each transmission area 110, 120, 130 may have a different size and shape and may include additional or other nodes. Also, each access point 112, 122, 132 and each STA 114, 124, 134 may transmit or receive additional or other frames or signals.

As described earlier, the IEEE 802.11ac standard introduces new features that are not understood by either legacy 802.11 STAs or 802.11n STAs. 802.11ac-compliant 80 MHz and 160 MHz communication channels, DL MU-MIMO, and 802.11ac preambles may not be utilized by legacy stations, including 802.11n STAs.

Figure 2:
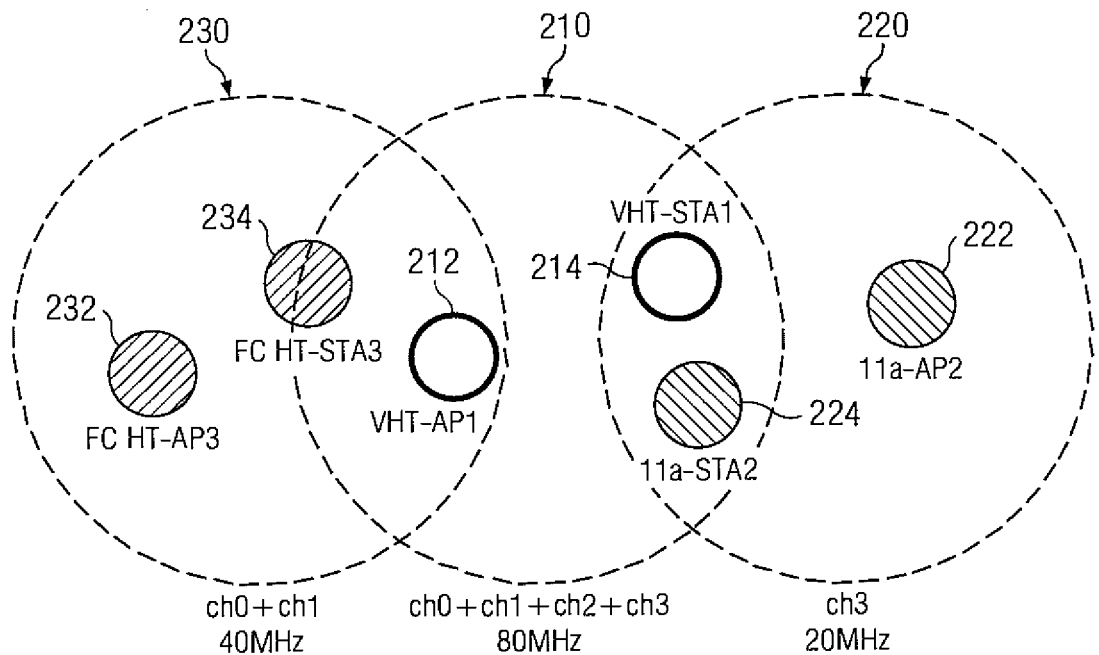
FIG. 2 illustrates a method for 802.11ac TXOP protection and truncation according to an embodiment of the present disclosure.
Figure 2:
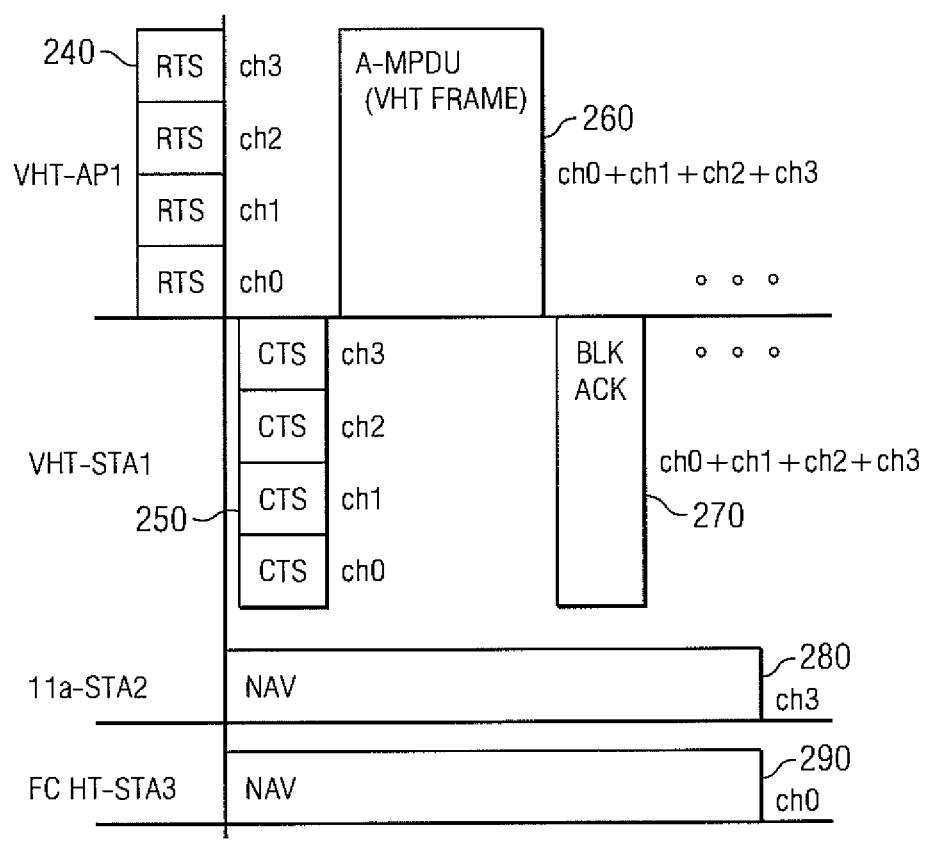

FIG. 2 illustrates a method for 802.11ac TXOP protection and truncation according to an embodiment of the present disclosure. As shown in FIG. 2, a VHT (very high throughput) access point 212 serves as an access point for an 802.11ac transmission area 210. A legacy (e.g., 802.11a) access point 222 serves as an access point for a second transmission area 220. A HT access point 232 serves as an access point for an 802.11n-compatible transmission area 230.

Transmissions to and from legacy access point 222 are carried over a legacy 20 MHz channel, designated in FIG. 2 as channel 3. Likewise, transmissions to and from HT access point 232 are carried over a HT 40 MHz channel that includes two legacy 20 MHz channels, designated as channel 0 and channel 1. Transmissions to and from VHT access point 212 are carried over a VHT 80 MHz channel that includes four 20 MHz channels: channel 0, channel 1, channel 2, and channel 3.

Each transmission area encompasses at least one station that is visible to the access point of that transmission area. For example, transmission area 210 includes VHT STA 214. Likewise, transmission area 220 includes legacy STA 224 and transmission area 230 includes HT STA 234. Due to overlap between the transmission areas, STA 224 is also within transmission area 210, VHT STA 214 is also within transmission area 220, and HT STA 234 is on the edge of transmission area 210.

An 802.11ac TXOP should be protected by frames which can be understood by 802.11a STAs and 802.11n STAs in each 20 MHz channel. For example, in order to protect their communication from interference, VHT access point 212 and VHT STA 214 may prepare to exchange an RTS/CTS handshake. However, transmission of either an 80 MHz RTS or an 80 MHz CTS will not be detected by legacy nodes 222, 224 or HT nodes 232, 234 because they are not 802.11ac-compatible. Therefore, as shown in FIG. 2, VHT access point 212 and VHT STA 214 may exchange an RTS/CTS handshake using non-HT and non-VHT replicate frames in 20 MHz channels.

For example, VHT access point 212 transmits four RTS frames 240, one on each of channel 0, channel 1, channel 2, and channel 3. Each RTS frame 240 is substantially a replicate of the other three. All four RTS frames 240 are on 20 MHz channels and are able to be understood by legacy STA 224, HT STA 234, and VHT STA 214. VHT STA 214 responds to RTS frames 240 by sending four CTS frames 250, one on each of channel 0, channel 1, channel 2, and channel 3. Each CTS frame 250 is substantially a replicate of the other three. All four CTS frames 250 are on 20 MHz channels and are able to be understood by legacy STAs 224, HT STA 234, and VHT access point 212.

Thus, the RTS 240 and CTS 250 are used to establish protection of a TXOP in four 20 MHz channels: channel 0, channel 1, channel 2, and channel 3. However, VHT access point 212 and VHT STA 214 may want to communicate on a single 80 MHz channel according to the 802.11ac standard. To establish a 80 MHz EDCA-based TXOP, VHT STA 214 executes an enhanced distributed channel access (EDCA) back-off procedure in the primary channel (e.g., channel 0), and detects that the secondary channels (e.g., channels 1 through 3) are idle during a PIFS interval before the TXOP.

Once the 80 MHz TXOP is established, VHT access point 212 and VHT STA 214 may communicate over the full 80 MHz channel. VHT access point 212 may transmit an A-MDPU unit 260 on a VHT frame. VHT STA 214 may then transmit an acknowledgement (ACK) block 270. This exchange may continue until the end of the TXOP. Non-HT replicate CF-End frames transmitted on channels 0 through 3 may be used to truncate the protected TXOP.

By listening to the RTS/CTS exchange between VHT STA 214 and VHT access point 212, legacy STA 224 and HT STA 234 know not to transmit any signals during the TXOP that would interfere with the communication between VHT STA 214 and VHT access point 212. Thus, legacy STA 224 counts down a NAV timer 280 on channel 3, and HT STA 234 counts down a NAV timer 290 on channel 0.

At the PHY (physical) layer, in order to protect the TXOP, VHT access point 212 may transmit a legacy preamble. The legacy preamble includes L-STF (short training field), L-LTF (long training field) and L-SIG (signal) blocks. The legacy preamble helps to ensure that legacy STAs avoid transmitting during the VHT TXOP. In certain embodiments, the 802.11ac preamble blocks (e.g., VHT-SIG, VHT-STF, VHT-LTF) are not transmitted because they may not be understood by legacy STAs.

Because 802.11ac supports 160 MHz transmissions, the method of TXOP protection and truncation described in FIG. 2 may also be applied to a 160 MHz embodiment as well. For example, transmission area 210 may include eight 20 MHz channels instead of four. Likewise, VHT access point 212 may transmit eight replicate RTS frames 240, one on each of the eight 20 MHz channels. VHT STA 214 may respond to RTS frames 240 by sending eight CTS frames 250, one on each of the eight 20 MHz channels. All eight RTS frames 240 and eight CTS frames 250, being on 20 MHz channels, are able to be understood by legacy STAs 224, HT STA 234, and VHT access point 212.

Although FIG. 2 illustrates examples of 802.11 TXOP protection and truncation, various changes may be made to FIG. 2. For example, each transmission area 210, 220, 230 may have a different size and shape and may include additional or other nodes. Also, each access point 212, 222, 232 and each STA 214, 224, 234 may transmit or receive additional or other frames or signals.

Negotiation of Idle Subchannel Set

Before communicating over a TXOP, a TXOP holder and a TXOP responder may detect different idle channels on which to generate the TXOP. In order for the TXOP holder and the TXOP responder to mutually determine a channel or group of subchannels on which to communicate over the TXOP, the TXOP holder and the TXOP responder may perform a channel negotiation.

Figure 3:
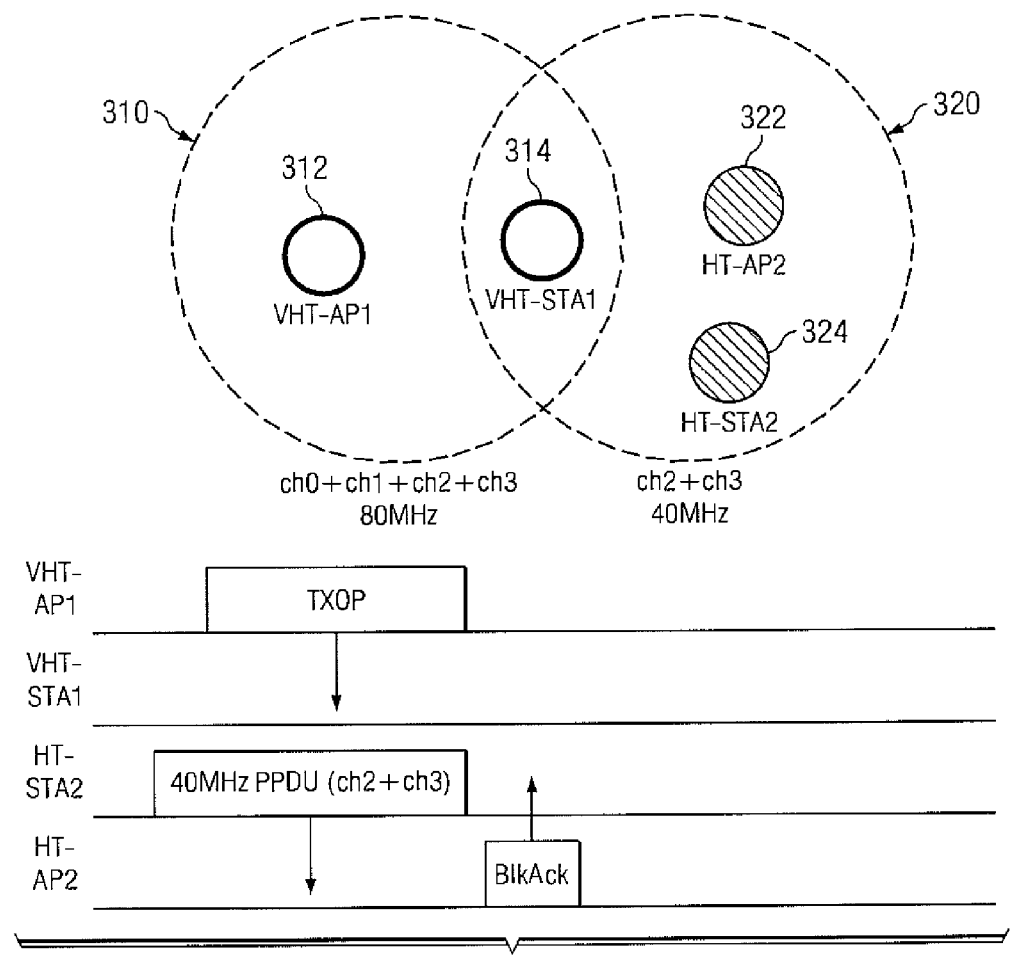
FIG. 3 illustrates an example of when channel negotiation may be required, according to an embodiment of the present disclosure.

FIG. 3 illustrates an example of when channel negotiation may be required, according to an embodiment of the present disclosure. As shown in FIG. 3, a VHT access point 312 serves as an access point for an 802.11ac transmission area 310 that encompasses a VHT STA 314. A HT access point 322 serves as an access point for a second (e.g., 802.11n) transmission area 320 that encompasses a HT STA 324. Transmissions to and from VHT access point 312 are carried over four legacy 20 MHz channels, channel 0 through channel 3, thus comprising one 80 MHz channel. Likewise, transmissions to and from HT access point 322 are carried over two legacy 20 MHz channels, channel 2 and channel 3, thus comprising a 40 MHz channel.

VHT access point 312 and VHT STA 314 may want to communicate during a TXOP. However, VHT access point 312 and VHT STA 314 detect different idle channels on which to carry the TXOP. For example, because it does not detect any activity on channels 0 through 3, VHT access point 312 may determine that all four channels are idle, thus providing an 80 MHz idle channel. However, HT access point 322 and HT STA 324 are communicating over a 40 MHz channel that includes channel 2 and channel 3. Because VHT STA 314 is within transmission area 320, VHT STA 314 can detect the communication between HT access point 322 and HT STA 324 over channels 2 and 3. Therefore, VHT STA 314 determines that only channel 0 and channel 1 are idle, thus providing a 40 MHz idle channel for the TXOP.

Although FIG. 3 illustrates one example of when channel negotiation may be required, various changes may be made to FIG. 3. For example, each transmission area 310, 320 may have a different size and shape and may include additional or other nodes. Also, each access point 312, 322 and each STA 314, 324 may transmit or receive additional or other frames or signals.

Idle channel negotiation allows the TXOP holder and the TXOP responder to select an appropriate TXOP channel set and channel width. The TXOP holder and the TXOP responder may notify each other of the idle operating channels for the following frame transmission through a non-HT replicate frame handshake. The handshake includes two frames: a non-HT replicate initiating frame and a non-HT replicate responding frame.

In one embodiment, the non-HT replicate initiating frame and non-HT replicate responding frame carry the idle operating channel information through the PHY header, the Control Wrapper header, or the MAC (Media Access Control) frame body. This method can be used when a STA can only decode replicate frames in a primary channel. According to 802.11ac channelization rules and subchannel usage criteria, a VHT STA may use a 20 MHz, 40 MHz, 80 MHz, or 160 MHz channel that includes a primary 20 MHz channel to transmit frames. Thus, a two-bit field can be used to indicate the idle subchannels. For example, the two-bit idle subchannel indication field can indicate idle 20 MHz, 40 MHz, 80 MHz, or 160 MHz subchannels.

In a second embodiment, a STA gets the TXOP holder's notification of idle channels through the non-HT replicate transmission in the related channels. This method may be used when a STA can decode non-HT replicate frames in the primary channel and secondary channels, or when a STA can determine the transmission channels of the protection frames through decoding non-HT replicate frames in the primary channel and the PHY header energy detection in the primary channel and secondary channels.

Figure 4:
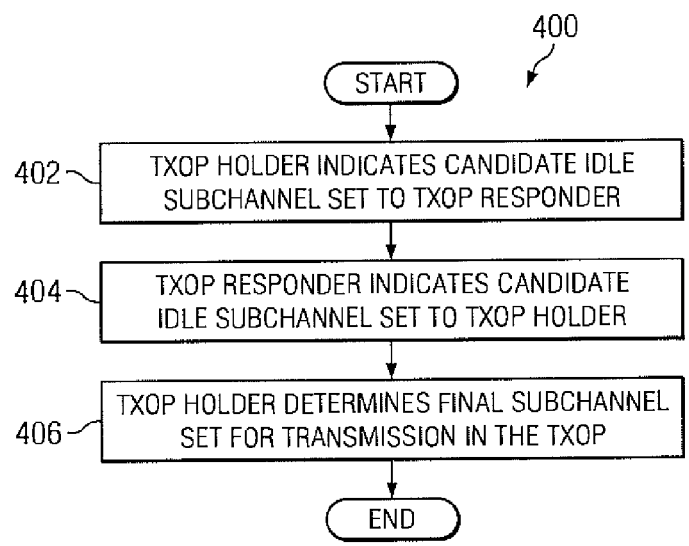
FIG. 4 illustrates a method for negotiating an idle subchannel set according to an embodiment of the present disclosure.

FIG. 4 illustrates a method for negotiating an idle subchannel set according to an embodiment of the present disclosure. Method 400 may be used, for example, in conjunction with the systems shown in FIGS. 1-3. Method 400, however, may be used with any other suitable system. Also, other embodiments of method 400 may be used without departing from the scope of this disclosure.

In block 402, the TXOP holder indicates a candidate set of idle subchannels to the TXOP responder. The set of idle subchannels may include both primary and secondary subchannels. An idle primary subchannel is a channel that is idle during an EDCA back-off. An idle secondary subchannel is a channel that is idle during PIFS before non-HT replicate initiating transmission.

In block 404, the TXOP responder indicates a candidate set of idle subchannels to the TXOP holder. The TXOP responder's candidate subchannel set is the same as, or a subset of, the candidate subchannel set from the TXOP holder. The TXOP responder's candidate subchannel set may include only the 20 MHz operating channels that the TXOP responder detects as idle.

In block 406, the TXOP holder decides the final subchannel set for the following frame transmission in the TXOP. If only one TXOP responder transmits a non-HT replicate responding frame, the candidate subchannel set from the TXOP responder is the final subchannel set. However, if multiple TXOP responders transmit non-HT replicate responding frames, the final subchannel set is determined to be the intersection of the different candidate subchannel sets received by the TXOP holder.

Although FIG. 4 illustrates one example of a method 400 for negotiating an idle subchannel set, various changes may be made to FIG. 4. For example, method 400 may include other steps not explicitly shown in FIG. 4. Also, various blocks in FIG. 4 may overlap, occur in parallel, occur in a different order, or occur multiple times.

Figure 5:
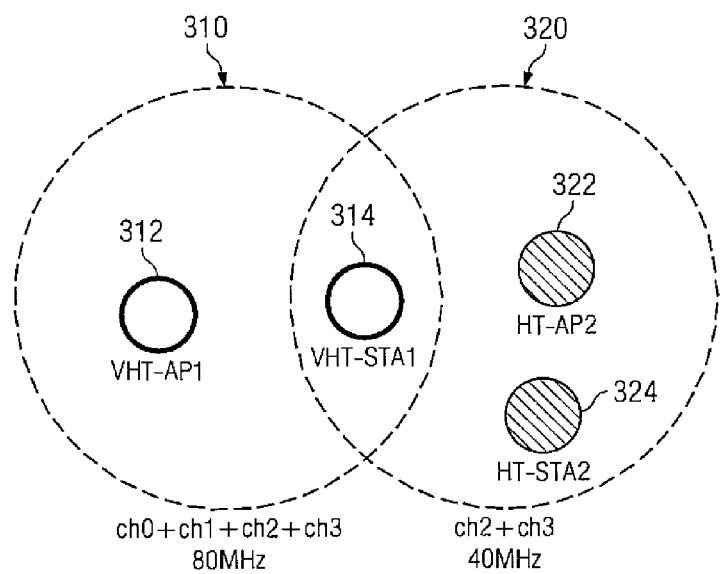
FIG. 5 illustrates a channel negotiation procedure according to an embodiment of the present disclosure.
Figure 5:
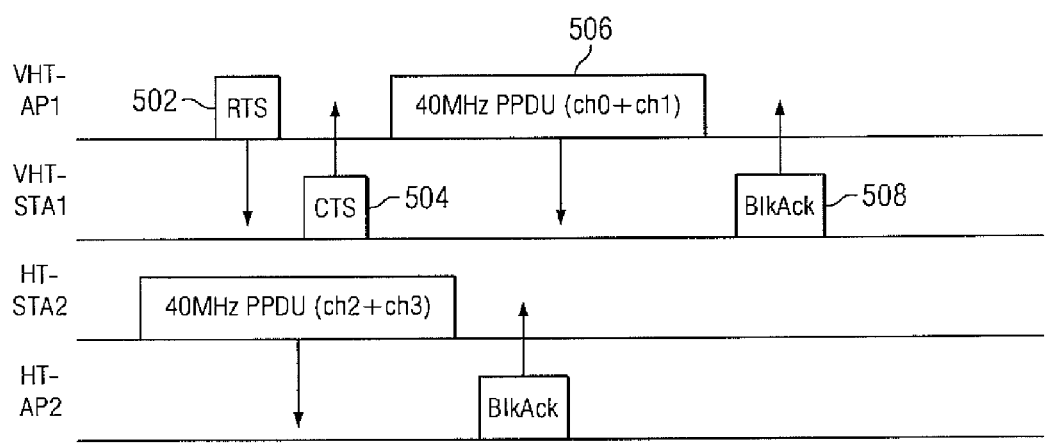

FIG. 5 illustrates a channel negotiation procedure according to an embodiment of the present disclosure. Like in FIG. 3, FIG. 5 shows that VHT access point 312 serves as an access point for 802.11ac transmission area 310, which encompasses VHT STA 314. HT access point 322 serves as an access point for second transmission area 320, which encompasses HT STA 324.

VHT access point 312 and VHT STA 314 detect different idle channels on which to carry a TXOP. VHT access point 312 may determine that all of channels 0 through 3 are idle, thus providing an 80 MHz idle channel. However, VHT STA 314 is within transmission area 320, so VHT STA 314 can detect the communication between HT access point 322 and HT STA 324 over channels 2 and 3. Therefore, VHT STA 314 determines that only channel 0 and channel 1 are idle, thus providing a 40 MHz idle channel for the TXOP.

VHT access point 312 transmits an RTS frame 502 to VHT STA 314. RTS frame 502 may comprise multiple replicate RTS frames over multiple 20 MHz channels, such as described in FIGS. 1 and 2. RTS frame 502 indicates that VHT access point 312 detects four idle channels, channel 0 through channel 3. VHT STA 314 transmits a CTS frame 504 back to VHT access point 312. CTS frame 504 may also comprise multiple replicate CTS frames over multiple 20 MHz channels. CTS frame 504 indicates that VHT STA 314 detects only two idle channels, channel 0 and channel 1. VHT access point 312 then determines the final subchannel set for the TXOP between VHT access point 312 and VHT STA 314. In this case, VHT access point 312 determines that the TXOP will use the two idle channels, channel 0 and channel 1 for a 40 MHz TXOP. Afterward, VHT access point 312 transmits a 40 MHz PPDU (PHY protocol data unit) 506 to VHT STA 314 over channels 0 and 1. VHT STA 314 responds with a block ACK 508.

Although FIG. 5 illustrates one example of a channel negotiation procedure, various changes may be made to FIG. 5. For example, each transmission area 310, 320 may have a different size and shape and may include additional or other nodes. Also, each access point 312, 322 and each STA 314, 324 may transmit or receive additional or other frames or signals.

In certain embodiments, multiple DL-SDMA (downlink spatial division multiple access) destinations may detect different available channels. If the access point can determine available channel information from the DL-SDMA destination, it can avoid interference in the following transmission in the TXOP.

Figure 6:
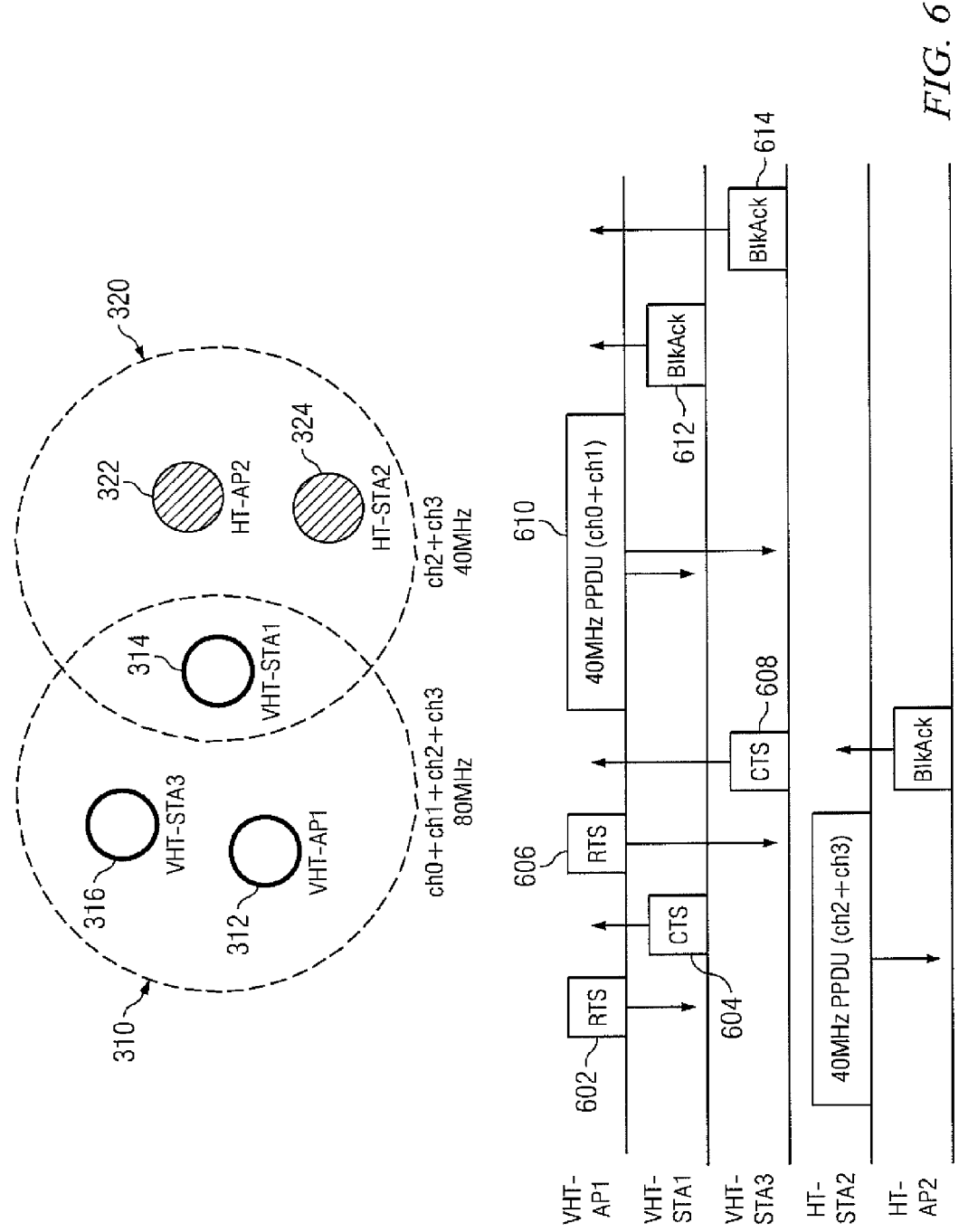
FIG. 6 illustrates a channel negotiation procedure with multiple DL-SDMA (downlink spatial division multiple access) destinations, according to an embodiment of the present disclosure.

FIG. 6 illustrates a channel negotiation procedure with multiple DL-SDMA destinations, according to an embodiment of the present disclosure. The channel negotiation procedure shown in FIG. 6 utilizes multiple RTS/CTS handshakes with multiple DL-SDMA destinations before the data frame transmission to determine the available channel information.

Like in FIGS. 3 and 5, FIG. 6 shows that VHT access point 312 serves as an access point for 802.11ac transmission area 310. Here, transmission area 310 encompasses two stations, VHT STA 314 and VHT STA 316. HT access point 322 serves as an access point for second transmission area 320, which encompasses HT STA 324.

VHT access point 312 and VHT STAs 314, 316 detect different idle channels on which to carry a TXOP. VHT access point 312 and VHT STA 316 are both outside transmission area 320 and may determine that all of channels 0 through 3 are idle, thus providing an 80 MHz idle channel. However, VHT STA 314 is within transmission area 320, so VHT STA 314 can detect the communication between HT access point 322 and HT STA 324 over channels 2 and 3. Therefore, VHT STA 314 determines that only channel 0 and channel 1 are idle, thus providing a 40 MHz idle channel for the TXOP.

VHT access point 312 transmits an RTS frame 602 to VHT STA 314. RTS frame 602 indicates that VHT access point 312 detects four idle channels, channel 0 through channel 3. VHT STA 314 transmits a CTS frame 604 back to VHT access point 312. CTS frame 604 indicates that VHT STA 314 detects only two idle channels, channel 0 and channel 1.

VHT access point 312 then transmits an RTS frame 606 to VHT STA 316. Using the information gained from CTS frame 604, RTS frame 606 indicates that only channels 0 and 1 are idle. VHT STA 316 transmits a CTS frame 608 back to VHT access point 312. CTS frame 608 indicates that VHT STA 316 also detects channel 0 and channel 1 as idle.

VHT access point 312 then determines the final subchannel set for the TXOP between VHT access point 312 and VHT STAs 314, 316. In this case, VHT access point 312 determines that the TXOP will use the two idle channels, channel 0 and channel 1, for a 40 MHz TXOP. Afterward, VHT access point 312 transmits a 40 MHz PPDU (PHY protocol data unit) 610 to VHT STAs 314, 316 over channels 0 and 1. In one embodiment, the PPDU 610 includes DL-SDMA frames. VHT STA 314 responds with a block ACK 612. VHT STA 316 responds with a block ACK 614.

Figure 7:
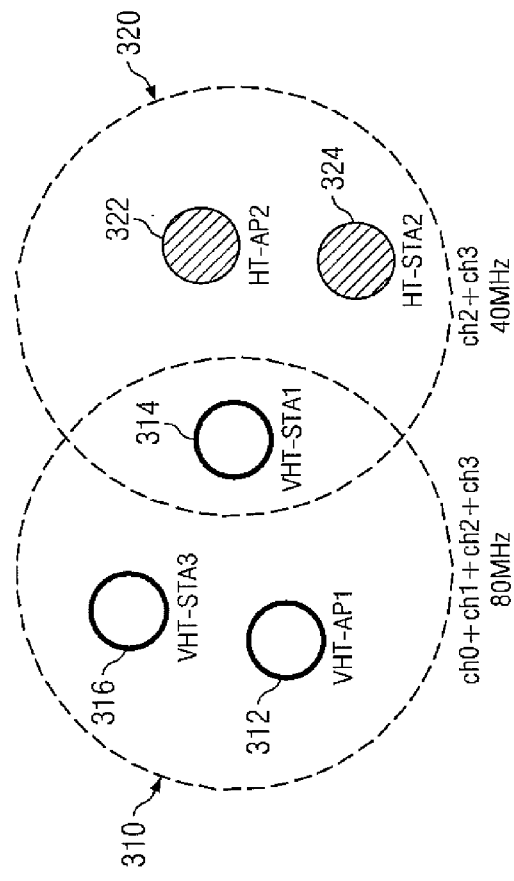
FIG. 7 illustrates a channel negotiation procedure with multiple DL-SDMA destinations, according to another embodiment of the present disclosure.
Figure 7:
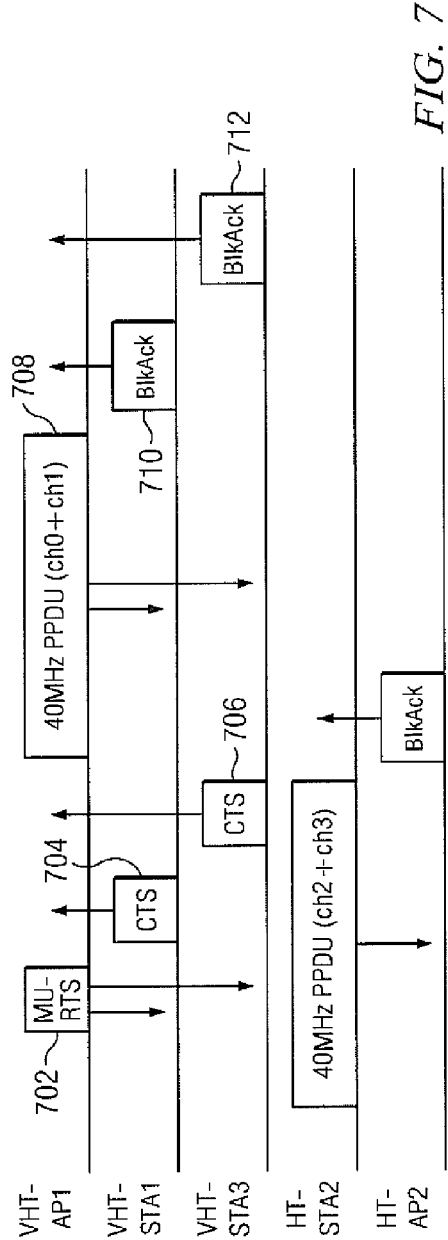

FIG. 7 illustrates a channel negotiation procedure with multiple DL-SDMA destinations, according to another embodiment of the present disclosure. The channel negotiation procedure shown in FIG. 7 defines a new multiple-user RTS control frame and allows multiple DL-SDMA destinations to report available channel information by separate CTS frames.

Like in FIG. 6, FIG. 7 shows that VHT access point 312 serves as an access point for 802.11ac transmission area 310, which encompasses two stations, VHT STA 314 and VHT STA 316. HT access point 322 serves as an access point for second transmission area 320, which encompasses HT STA 324.

VHT access point 312 and VHT STA 316 are both outside transmission area 320 and may determine that all of channels 0 through 3 are idle, thus providing an 80 MHz idle channel. VHT STA 314 is within transmission area 320, so VHT STA 314 can detect the communication between HT access point 322 and HT STA 324 over channels 2 and 3. VHT STA 314 determines that only channel 0 and channel 1 are idle, thus providing a 40 MHz idle channel for the TXOP.

VHT access point 312 transmits a multiple-user RTS frame 702 to both VHT STAs 314, 316. MU-RTS frame 702 indicates that VHT access point 312 detects four idle channels, channel 0 through channel 3. VHT STA 314 transmits a first CTS frame 704 back to VHT access point 312. CTS frame 704 indicates that VHT STA 314 detects only two idle channels, channel 0 and channel 1. VHT STA 316 transmits a second CTS frame 706 back to VHT access point 312. CTS frame 706 indicates that VHT STA 316 detects four idle channels, channels 0 through 3.

VHT access point 312 then uses the information from both CTS frames 704, 706 to determine the final subchannel set for the TXOP between VHT access point 312 and VHT STAs 314, 316. In this case, VHT access point 312 determines that the TXOP will use the two idle channels, channel 0 and channel 1, for a 40 MHz TXOP. Afterward, VHT access point 312 transmits a 40 MHz PPDU (PHY protocol data unit) 708 to VHT STAs 314, 316 over channels 0 and 1. In one embodiment, the PPDU 708 includes DL-SDMA frames. VHT STA 314 responds with a block ACK 710. VHT STA 316 responds with a block ACK 712.

Although FIGS. 6 and 7 illustrate examples of a channel negotiation procedure with multiple DL-SDMA destinations, various changes may be made to FIGS. 6 and 7. For example, any of the RTS and CTS frames described in FIGS. 6 and 7 may represent multiple replicate RTS and CTS frames transmitted over different 20 MHz channels, such as described in FIGS. 1, 2, and 5. Each transmission area 310, 320 may have a different size and shape and may include additional or other nodes. Also, each access point 312, 322 and each STA 314, 316, 324 may transmit or receive additional or other frames or signals.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for negotiating an idle subchannel set for a wireless data transmission, the method comprising:
concurrently transmitting, by a TXOP (transmission opportunity) holder, a plurality of replicate RTS (ready-to-send) frames indicating a first set of idle subchannels to a TXOP responder;
receiving, from the TXOP responder, a plurality of replicate CTS (clear-to-send) frames indicating a second set of idle subchannels; and
determining a final set of idle subchannels based on the indication of the first set of idle subchannels and the indication of the second set of idle subchannels, wherein an idle channel comprises an IEEE 802.11ac channel, wherein each of the replicate RTS frames is transmitted on a different 802.11 legacy channel, and wherein an IEEE 802.11 legacy station, upon detection of at least one of the replicate RTS frames and at least one of the replicate CTS frames, counts down a timer on one of the IEEE 802.11 legacy channels.

2. The method of claim 1, wherein each RTS frame is transmitted in a different subchannel among the first set of idle subchannels and each CTS frame is received in a different subchannel among the second set of idle subchannels.

3. The method of claim 1, wherein when the TXOP holder detects an idle 40 MHz channel, the replicate RTS frames comprise two RTS frames, each RTS frame transmitted on a 20 MHz channel.

4. The method of claim 3, wherein when the TXOP responder detects an idle channel that is a subset of the 40 MHz channel detected by the TXOP holder, each CTS frame is received on a corresponding 20 MHz channel.

5. The method of claim 1, wherein when the TXOP holder detects an idle 80 MHz channel, the replicate RTS frames comprise four RTS frames, each RTS frame transmitted on a 20 MHz channel.

6. The method of claim 5, wherein when the TXOP responder detects an idle channel that is a subset of the 80 MHz channel detected by the TXOP holder, each CTS frame is received on a corresponding 20 MHz channel.

7. The method of claim 6, wherein the 80 MHz channel comprises an IEEE 802.11ac channel and each of the replicate RTS frames is transmitted on a different 802.11 legacy channel.

8. The method of claim 1, wherein when the TXOP holder detects an idle 160 MHz channel, the replicate RTS frames comprise eight RTS frames, each RTS frame transmitted on a 20 MHz channel.

9. The method of claim 8, wherein when the TXOP responder detects an idle channel that is a subset of the 160 MHz channel detected by the TXOP holder, each CTS frame is received on a corresponding 20 MHz channel.

10. The method of claim 1, further comprising:
transmitting a two-bit idle subchannel indication field, the field being used to indicate if a 20 MHz, 40 MHz, 80 MHz, or 160 MHz channel is idle.

11. The method of claim 1, further comprising:
transmitting an indication of a third set of idle subchannels to a second TXOP responder, the third set of idle subchannels based on the indication of the first set of idle subchannels and the indication of the second set of idle subchannels; and
receiving an indication of a fourth set of idle subchannels from the second TXOP responder;
wherein the final set of idle subchannels is further determined based on the indication of the third set of idle subchannels and the indication of the fourth set of idle subchannels.

12. The method of claim 1, wherein the TXOP responder is a first TXOP responder, the method further comprising:
transmitting the indication of the first set of idle subchannels to at least one second TXOP responder, wherein the indication of the first set of idle subchannels is transmitted concurrently to the first TXOP responder and the at least one second TXOP responder in at least one multiple-user RTS (MU-RTS) frame.

13. For use in a wireless network, a TXOP (transmission opportunity) holder configured to negotiate an idle subchannel set for communication with a TXOP responder in the wireless network, the TXOP holder configured to:
concurrently transmit a plurality of replicate RTS (ready-to-send) frames indicating a first set of idle subchannels to the TXOP responder;
receive, from the TXOP responder, a plurality of replicate CTS (clear-to-send) frames indicating a second set of idle subchannels; and
determine a final set of idle subchannels based on the indication of the first set of idle subchannels and the indication of the second set of idle subchannels, wherein an idle channel comprises an IEEE 802.11ac channel, wherein each of the replicate RTS frames is transmitted on a different 802.11 legacy channel, and wherein an IEEE 802.11 legacy station, upon detection of at least one of the replicate RTS frames and at least one of the replicate CTS frames, counts down a timer on one of the IEEE 802.11 legacy channels.

14. The TXOP holder of claim 13, wherein each RTS frame is transmitted in a different subchannel among the first set of idle subchannels and each CTS frame is received in a different subchannel among the second set of idle subchannels.

15. The TXOP holder of claim 13, wherein when the TXOP holder detects an idle 40 MHz channel, the replicate RTS frames comprise two RTS frames, each RTS frame transmitted on a 20 MHz channel.

16. The TXOP holder of claim 15, wherein when the TXOP responder detects an idle channel that is a subset of the 40 MHz channel detected by the TXOP holder, each CTS frame is received on a corresponding 20 MHz channel.

17. The TXOP holder of claim 13, wherein when the TXOP holder detects an idle 80 MHz channel, the replicate RTS frames comprise four RTS frames, each RTS frame transmitted on a 20 MHz channel.

18. The TXOP holder of claim 17, wherein when the TXOP responder detects an idle channel that is a subset of the 80 MHz channel detected by the TXOP holder, each CTS frame is received on a corresponding 20 MHz channel.

19. The TXOP holder of claim 13, wherein when the TXOP holder detects an idle 160 MHz channel, the replicate RTS frames comprise eight RTS frames, each RTS frame transmitted on a 20 MHz channel.

20. The TXOP holder of claim 19, wherein when the TXOP responder detects an idle channel that is a subset of the 160 MHz channel detected by the TXOP holder, each CTS frame is received on a corresponding 20 MHz channel.

21. The TXOP holder of claim 13, further configured to:
transmit a two-bit idle subchannel indication field, the field being used to indicate if a 20 MHz, 40 MHz, 80 MHz, or 160 MHz channel is idle.

22. The TXOP holder of claim 13, further configured to:
transmit an indication of a third set of idle subchannels to a second TXOP responder, the third set of idle subchannels based on the indication of the first set of idle subchannels and the indication of the second set of idle subchannels; and
receive an indication of a fourth set of idle subchannels from the second TXOP responder;
wherein the final set of idle subchannels is further determined based on the indication of the third set of idle subchannels and the indication of the fourth set of idle subchannels.

23. The TXOP holder of claim 13, wherein the TXOP responder is a first TXOP responder, the TXOP holder further configured to:
transmit the indication of the first set of idle subchannels to at least one second TXOP responder, wherein the indication of the first set of idle subchannels is transmitted concurrently to the first TXOP responder and the at least one second TXOP responder in at least one multiple-user RTS (MU-RTS) frame.

24. A method for protecting a TXOP (transmission opportunity) for a wireless data transmission, the method comprising:
concurrently transmitting, by a TXOP holder, a plurality of replicate RTS (ready-to-send) frames indicating a first set of idle subchannels to a TXOP responder; and
receiving a plurality of replicate CTS (clear-to-send) frames from the TXOP responder;
wherein an idle channel comprises an IEEE 802.11ac channel, wherein each RTS frame is transmitted on a different idle 20 MHz 802.11 legacy channel selected from a set of one or more idle 20 MHz 802.11 legacy channels and each CTS frame is received on one of the one or more of the different idle 20 MHz 802.11 legacy channels used for transmission of the RTS frames, and wherein an IEEE 802.11 legacy station, upon detection of at least one of the replicate RTS frames and at least one of the replicate CTS frames, counts down a timer on one of the IEEE 802.11 legacy channels.

* * * * *